(12) United States Patent
Warmerdam

(10) Patent No.: US 6,361,015 B1
(45) Date of Patent: Mar. 26, 2002

(54) VARIABLE FLOW-THROUGH CONTROL PLUG

(75) Inventor: Gerard G. Warmerdam, Lodi, CA (US)

(73) Assignee: Plug-It Products Corporation, Lodi, CA (US)

( * ) Notice: Subject to any disclaimer, the term of this patent is extended or adjusted under 35 U.S.C. 154(b) by 0 days.

(21) Appl. No.: 09/625,831

(22) Filed: Jul. 26, 2000

(51) Int. Cl.⁷ ................................. F16K 7/07
(52) U.S. Cl. .................. 251/5; 137/454.2; 138/93
(58) Field of Search .............. 251/5; 137/454.2; 138/93

(56) References Cited

U.S. PATENT DOCUMENTS 2,769,397 A * 11/1956 Bolger .................. 251/5
3,854,694 A * 12/1974 Coone .................. 251/5

* cited by examiner

Primary Examiner—John Fox
(74) Attorney, Agent, or Firm—Richard Esty Peterson

(57) ABSTRACT

A flow-through pipe plug for conduits which permits controlled blockage of fluid flow in a conduit in which the plug is installed, the plug having a rigid cylindrical core on which are secured an outer bladder and an inner bladder, the bladders and core forming chambers between the bladders and the core, the core having pressurizable fluid supply pipes to the chambers with hose connectors for connecting the supply pipes to an auxiliary component for independent pressurization of the chambers and expansion of the respective bladders with the outer bladder expanding to the inner wall of the conduit in which it is installed and the inner bladder expanding to block passage through the core.

9 Claims, 2 Drawing Sheets

VARIABLE FLOW-THROUGH CONTROL PLUG

BACKGROUND OF THE INVENTION

This invention relates to pneumatic plugs and flow-through diverters that are frequently used in piping systems during inspection and repairs. Various pneumatic devices having expandable bladders have been used in piping systems to block the flow, in a pipe or a conduit, preventing fluids, primarily liquids, from flowing through the pipe or conduit, particularly at the location of a work area. The use of pneumatic devices as blocking plugs, diverters or repair devices is well known in the industry. For example, this inventor has designed and patented a "Pipe Joint Testing and Grouting Unit" disclosed in U.S. Pat. No. 5,066,208, issued Nov. 19, 1991. The device of the referenced patent includes a rigid cylindrical core having an outer pneumatic bladder that can be inflated by the use of a pressurized fluid such as air. When the unit is placed at a joint that is in need of repair, a repair cement can be pumped through a connecting line to the perimeter of the inflated bladder to fill any void in the joint.

Other inflatable devices have been fabricated which allow the flow of a pipe or conduit to be diverted through a diversionary conduit by the use of an inflatable plug-like unit having a core with an attachable conduit such as a flexible hose to divert the liquid flow through the pipe under repair to a downstream location or to another holding area. This diverter unit is usually constructed with an inflatable plug having a rigid cylindrical core having an end with a permanent or replaceable end plate. The end plate has a projecting nipple for connecting a flexible hose or pipe using a clamp to clamp the flexible hose to the nipple.

There are situations when using a flow diverter unit where control of the rate of flow is desired. For example, in diverting the flow through a manhole during rehabilitation of the manhole, it is advantageous to stop and start the flow during hook-up.

In the preferred embodiment, the central rigid core provides a stable mounting surface for the projecting pipe segments that, in the usual case, connect to the air hoses of a compressor. Independent regulation of the air pressure in the respective inner and outer bladders is accomplished at the air compressor in a conventional manner. The variable flow-through control plug is designed with a rigid core sized to maximize the flow through the unit. In this manner, the units are preferably offered in a series of sizes to accommodate different sizes of conduit, for example, sewer pipe that require a controllable blockage.

The flow-through control plug of this invention is designed for installation within a pipe or conduit where the flow must be regulated or blocked according to conditions arising at the site. Other uses will become apparent to those in the field. As noted, customarily, the variable flow-through control plug is used in conjunction with a flow diverter allowing a section of a water flow system to be bypassed for repair or inspection.

SUMMARY OF THE INVENTION

The variable flow control plug of this invention is designed with a central rigid core that is substantially cylindrical in configuration. Around the core is an annular bladder that is expanded typically using pressurized air. In addition, an internal bladder that is annular in configuration is secured to the rigid core and similarly inflated by pressurized air.

For example, in a standard manhole unit of a sewer system, water flows into the manhole through an entry conduit and out the manhole through an exit conduit, the manhole functioning as a surge basin and pressure relief. During rehabilitation of the manhole, it is desirable to connect the entry conduit with the exit conduit. Use of the invented flow-through control plug connected to a conventional flow through diverter by a flexible duct allows water flow from the entry conduit to the exit conduit to be stopped or regulated. Furthermore, installation of the flow-through control plug during high flow conditions can be facilitated by allowing flow during positioning and inflation of the outer bladder, and blocking flow after the unit is properly seated. Connection of a flexible diverter duct, with or without a complimentary flow through diverter, can then be accomplished with a blocked water flow.

It is to be understood, that in certain situations it may be desirable to expand the bladders using a gas other than air or using a liquid such as water. For example, where the flow-through control plug is used in a conduit system for transporting fuel or an explosive gas, it is desirable that a gas such as nitrogen or carbon dioxide be used.

These and other features will become apparent from considering the detailed description of the preferred embodiment that follows.

DETAILED DESCRIPTION OF THE PREFERRED EMBODIMENT

Figure 1:
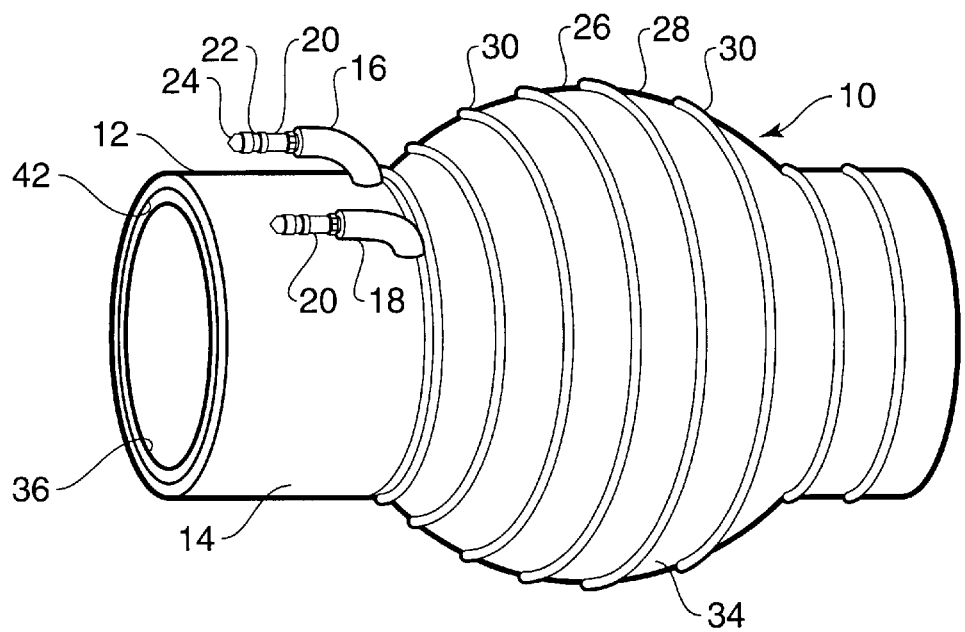
FIG. 1 is a perspective side view of the variable flow-through control plug of this invention.

In the perspective view of FIG. 1, there is shown a variable flow-through control plug, designated generally by the reference numeral 10. The variable flow-through control plug 10 is constructed with a cylindrical core 12 fabricated from a rigid material such as aluminum conduit. The core 12 has an exposed end-portion 14 on which are welded two relatively small pipe segments 16 and 18 which provide a passage to the interior of the core 12. The pipe segments 16 and 18 are each equipped with a hose connector 20 having a threaded end 22 protected by a cap 24. In use, the caps 24 are removed and the two pipe segments 16 and 18 are connected to a pneumatic hose or other fluid feed line to supply pressurized fluid to the pipe segments 16 and 18.

Figure 2:
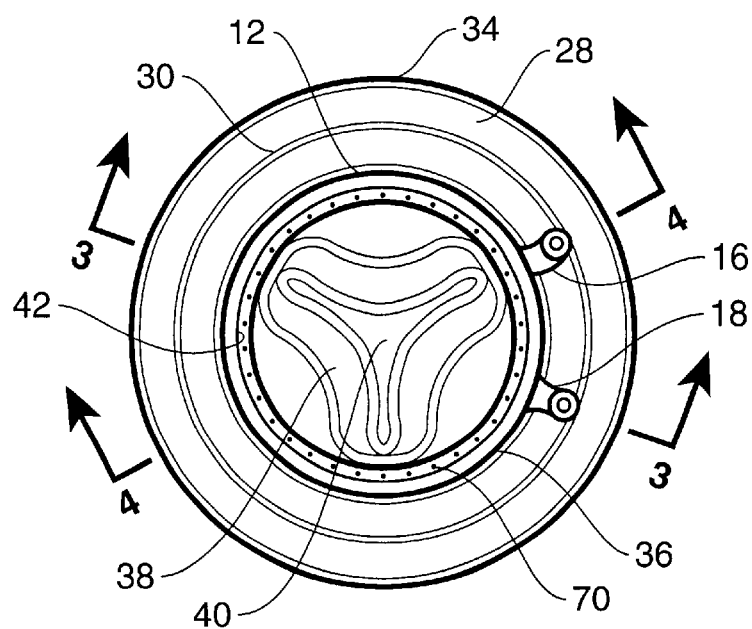
FIG. 2 is an end view of the control plug of FIG. 1 showing the air connectors.
Figure 3:
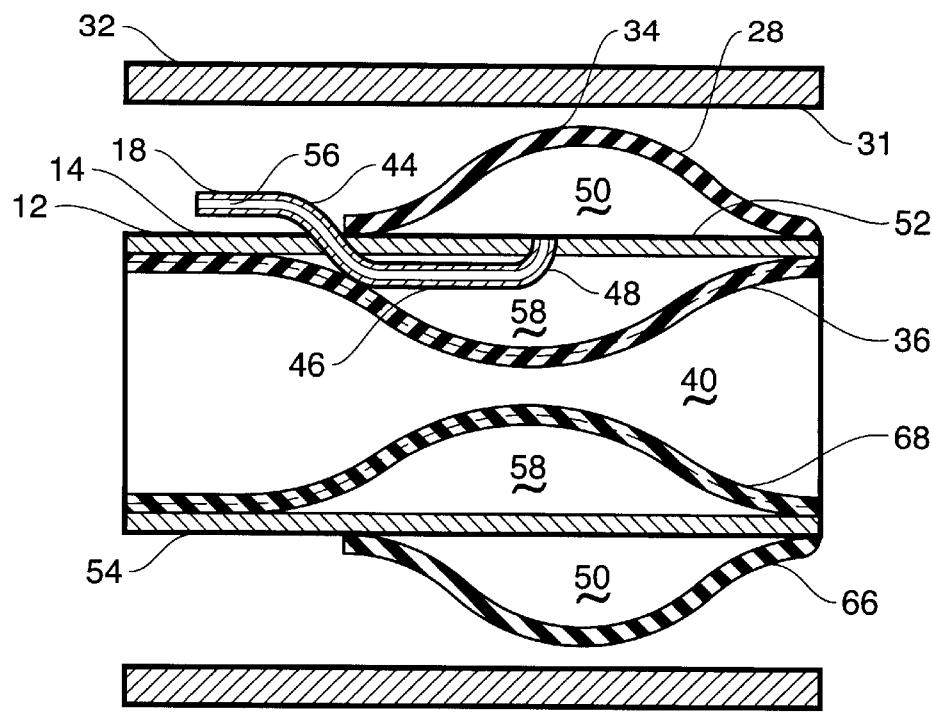
FIG. 3 is a cross-sectional view of the control plug of FIG. 2 taken on the lines 3—3 in FIG. 2 shown in a section of conduit.
Figure 4:
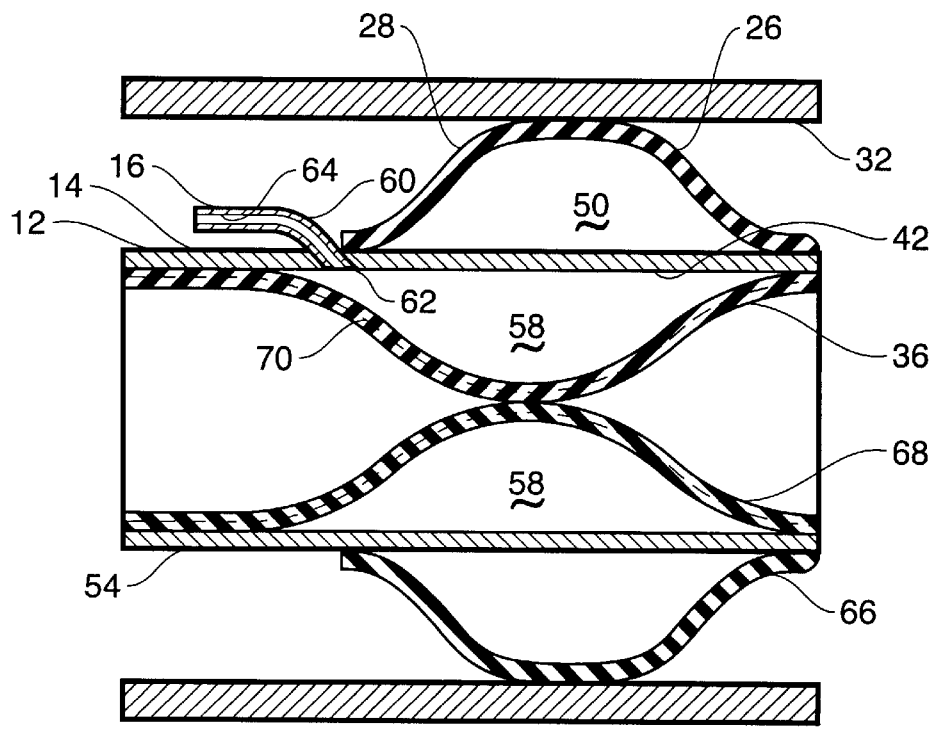
FIG. 4 is a cross-sectional view of the control plug of FIG. 1 taken on the lines 4—4 in FIG. 2 shown partially inflated in the section of conduit of FIG. 3.

As shown in FIGS. 1 and 2, the core 12 has an outer annular bladder 26 fabricated of a rubber or rubber-like material such as Neoprene®. The outer bladder 26 has an outer surface 28 having a series of circumferential ribs 30. In use, the control plug 10 is inserted within the end of a conduit or pipe and inflated so that the outer bladder 26 expands against the inner wall 31 of a conduit 32, as shown in FIGS. 3 and 4. The series of ribs 30 assist in preventing the inflated control plug from dislocating when under a fluid pressure that may be backing up within the blocked conduit. Preferably, the annular bladder 26 on the outside of the core 12 has a bulge 34 in its relaxed or unpressurized state which allows the bladder 26 to protect the protruding pipe segments 16 and 18 and prevent installation of the unit in a conduit that is of inside diameter much smaller than the diameter of the bulged bladder.

In addition to an outer bladder 26, the variable flow-through control plug 10 includes an inner annular bladder 36. The inner annular bladder 36 also includes a central bulge 38 which results in the folded configuration as shown in FIG. 2 with a clear passage 40 at the center. In use, the central bulge will substantially collapse against the inside surface 42 of the core 12 under fluid pressure in the conduit when the bladder is not pressurized. In certain circumstances where maximum flow of fluid in the conduit 32 is desired, and the fluid is of minimum pressure, the bladder can be drawn substantially against the inside surface 42 of the core 12 by negative pressure in the appropriate pipe segment 16.

Referring to the cross-sectional view of FIG. 3, the flow-through control plug is shown centrally positioned in the conduit 32. The pipe segment 18, shown projecting from the end portion 14 of core 12, is a part of a continuous supply pipe 44 having an internal segment 46 and an end segment 48 that returns through the core 12 to the chamber 50 formed by a portion 52 of the outside surface 54 of the core 12. In this manner, air or other fluid supplied to an inner passage 56 of the supply pipe 44 enters the chamber 50. Notably, the supply pipe 44 for the outer bladder 26 passes internally in a chamber 58.

Referring now to FIG. 4, the projecting pipe segment 16 shown in FIG. 1 is a portion of a short supply pipe 60 having an end 62 that terminates on the inside surface 42 of the core 12. In this manner, a passage 64 in the supply pipe 60 communicates with the air chamber 58 formed by the inner annular bladder 36. Pressurized fluid can be supplied by a pressurized supply source to the supply pipe 60 to expand the inner annular bladder 36. As shown in FIG. 4, both the inner and outer bladder are partially expanded to illustrate the contact of the surface 28 of the outer bladder 26 with the inner wall 31 of the conduit 32 and the contact of the inner bladder 36 upon itself closing passage 40. By increasing the pressure in the outer bladder 26, the holding force of the bladder against the conduit 32 can be increased. Similarly, by increasing or reducing the pressure of the inner annular bladder 36 the allowable opening 40 can be controlled or regulated. In this manner, the flow of fluid through the conduit can be controlled externally by increasing or decreasing the pressure of the fluid supply pipe 60. The rate of flow diverted can thereby be regulated or stopped according to the conditions at the work site.

The flow-through pipe plug is preferably fabricated with an aluminum core and aluminum pipe segments 16 and 18 welded to the core 12 in the configuration shown in FIGS. 3 and 4. During assembly of the annular bladders 26 and 36 to the rigid core 12, portions of the core under the ends 66 and 68 of the outer bladder 26 and inner bladder 36 are coated with an adhesive. The partially vulcanized bladders 26 and 36 are installed and vulcanization completed securing the bladder ends 66 and 68 to the metal core 12. The inner bladder 36 includes internal reinforcing cord 70 to prevent the bladder from bulging out of the core 12 during inflation.

The exposed end portion 14 of the core 12 permits connection of an auxiliary component such as a flexible duct when the flow-through pipe plug is used during rehabilitation of a manhole unit.

In use, the flexible duct, not shown, can be installed over the exposed end-portion 14 of the core 12. The projecting pipe segments 16 and 18 are curved away from the core to allow the end of a duct to slip over the end-portion 14 under the connectors 20 of the end segments 16 and 18. The duct is secured with a conventional hose clamp. The hose connectors 20 are customarily connected to the pneumatic hoses of a conventional air compressor unit with the capability of independently regulating the air pressure to each pipe segment. Control of the pressure is accomplished at the compressor in a well-known manner for this type of pneumatic system.

While, in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A flow-through pipe plug comprising:
   (a) a rigid cylindrical core member having an inside surface and an outside surface;
   (b) an expandable outer annular bladder mounted on the outside surface of the core member, the expandable outer annular bladder being expandable against an inside wall of a conduit when the pipe plug is inserted in the conduit and the outer annular bladder is expanded; and
   (c) an expandable inner annular bladder mounted on the inside surface of the core member, wherein a central passage is formed, the central passage closing on expansion of the inner annular bladder.

2. The flow-through pipe plug of claim 1 wherein the core has an exposed end-portion with first and second fluid supply connector means for supplying a pressurized fluid to the outer annular bladder and the inner annular bladder.

3. The flow-through pipe plug of claim 2 wherein the first and second fluid supply connector means comprises a first hose connector having a passage means to the outer annular bladder and a second hose connector having a passage means to the inner annular bladder.

4. The flow-through pipe plug of claim 3 wherein the passage means to the outer annular bladder means to the outer annular bladder in the first fluid supply connector means comprises a supply pipe, having a pipe segment projecting from the outer surface of the core and a portion of the pipe passing through the core to the outer annular bladder.

5. The flow-through pipe plug of claim 3 wherein the passage means to the outer annular bladder in the second fluid supply connector means comprises a supply pipe having a pipe segment projecting from the outer surface of the core and a portion of the pipe passing through the core to the inner annular bladder.

6. The flow-through pipe plug of claim 1 wherein a chamber is formed between the outer annular bladder and the outside surface of the core.

7. The flow-through pipe plug of claim 1 wherein a chamber is formed between the inner annular bladder and the inside surface of the core.

8. The flow-through pipe plug of claim 3 wherein the core has an exposed end segment for connection of auxiliary components.

9. The flow-through pipe plug of claim 1 wherein the inner annular bladder has reinforcing cord.

* * * * *